US010029751B2

(12) United States Patent
Ueno (10) Patent No.: US 10,029,751 B2
(45) Date of Patent: Jul. 24, 2018

(54) FRONT STRUCTURE OF SADDLE RIDING TYPE VEHICLE

(71) Applicant: HONDA MOTOR CO., LTD., Tokyo (JP)

(72) Inventor: Hirotsugu Ueno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 321 days.

(21) Appl. No.: 15/066,919

(22) Filed: Mar. 10, 2016

(65) Prior Publication Data

US 2016/0288855 A1    Oct. 6, 2016

(30) Foreign Application Priority Data

Mar. 30, 2015   (JP) ................. 2015-069970

(51) Int. Cl.

| | |
|---|---|
| *B62J 11/00* | (2006.01) |
| *B62J 6/00* | (2006.01) |
| *B62J 6/02* | (2006.01) |
| *B62J 99/00* | (2009.01) |
| *B62K 11/14* | (2006.01) |
| *B62K 19/40* | (2006.01) |
| *B60K 35/00* | (2006.01) |
| *B62K 19/30* | (2006.01) |

(Continued)

(52) U.S. Cl.
CPC ................. *B62J 6/02* (2013.01); *B60K 35/00* (2013.01); *B62J 6/00* (2013.01); *B62J 11/00* (2013.01); *B62J 17/04* (2013.01); *B62J 99/00* (2013.01); *B62K 11/14* (2013.01); *B62K 19/30* (2013.01); *B62K 19/40* (2013.01); *B62K 21/18* (2013.01); *B62J 2099/0033* (2013.01)

(58) Field of Classification Search
CPC ... B62J 99/00; B62J 6/00; B62J 11/00; B62K 11/14; B62K 19/30; B62K 19/40; B60K 35/00

See application file for complete search history.

(56) References Cited

U.S. PATENT DOCUMENTS 4,687,072 A * 8/1987 Komuro ................... B62J 6/001
                                                                                                          180/219
6,158,279 A * 12/2000 Saiki ....................... G01P 1/026
                                                                                                          324/166

(Continued)

FOREIGN PATENT DOCUMENTS

| EP | 3015349 A1 * | 5/2016 | ............. B60K 35/00 |
|---|---|---|---|
| JP | 5009110 B | 8/2012 | |
| JP | 2013112164 A * | 6/2013 | |

*Primary Examiner* — Joseph M Rocca
*Assistant Examiner* — Daniel S Yeagley
(74) *Attorney, Agent, or Firm* — Chip Law Group (57) ABSTRACT

A top bridge 11 supports upper portions of a pair of left and right front forks 10 that rotatably support a front wheel. A handlebar 14 is fixed above the top bridge 11. A meter 30 and a meter visor 18 that covers the meter 30 are supported via a meter stay 40 at a position anterior to the top bridge 11. The meter stay 40 includes a proximal portion 41 that is fastened to a front surface of the top bridge 11, a first arm portion 42 that extends forwardly from the proximal portion 41, a visor support portion 43 disposed at a front end of the first arm portion 42, and second arm portions 45 that extend obliquely upwardly toward a rear from the visor support portion 43.

20 Claims, 6 Drawing Sheets

(51) Int. Cl.
*B62J 17/04* (2006.01)
*B62K 21/18* (2006.01)

(56) References Cited

U.S. PATENT DOCUMENTS

| | | | | |
|---|---|---|---|---|
| 7,427,152 | B2* | 9/2008 | Erion | F21S 41/147 |
| | | | | 362/547 |
| 7,681,901 | B2* | 3/2010 | LaCour | B62J 99/00 |
| | | | | 280/279 |
| 8,506,000 | B2* | 8/2013 | Hasegawa | B62J 99/00 |
| | | | | 296/70 |
| 2002/0041077 | A1* | 4/2002 | Hideo | B62J 11/00 |
| | | | | 280/288.4 |
| 2008/0054138 | A1* | 3/2008 | Ieda | B62K 5/01 |
| | | | | 248/214 |
| 2012/0160054 | A1* | 6/2012 | Kawai | B62J 99/00 |
| | | | | 74/551.1 |
| 2015/0258929 | A1* | 9/2015 | Kato | B62J 6/02 |
| | | | | 362/473 |
| 2015/0266410 | A1* | 9/2015 | Takaya | B62J 6/02 |
| | | | | 362/476 |

\* cited by examiner

FRONT STRUCTURE OF SADDLE RIDING TYPE VEHICLE

CROSS REFERENCE TO RELATED APPLICATIONS

This application claims the benefit of Japanese Priority Patent Application JP 2015-069970 filed on Mar. 30, 2015, the entire contents of which are incorporated herein by reference.

TECHNICAL FIELD

The present application relates to a front structure of a saddle riding type vehicle and, more particularly, to a structure for advantageously supporting a headlight and a meter.

BACKGROUND ART

Patent Document 1 discloses an arrangement of a meter in a motorcycle wherein a handlebar of the motorcycle is fixed on a top bridge with a handlebar clamp, the handlebar clamp is covered in a clamp cover from above, the clamp cover is extended to a position above a headlight at the front of the motorcycle, and the meter is disposed inside the clamp cover and covered in a meter visor from the front.

PRIOR ART DOCUMENT

Patent Document

[Patent Document 1]
Japanese Patent No. 5009110

SUMMARY OF APPLICATION

The meter arrangement disclosed in Patent Document 1 described above includes a meter support portion that is relatively complicated. The complexity of the meter support portion necessitates covering of the meter support portion with the meter cover. The meter cover is complicated and large in size and thus requires another support structure that is different from the support for the meter. This leads to a complicated and large-sized front of the vehicle. It is therefore an object of the present application to reduce weight of, and simplify, a front of a vehicle.

To achieve the foregoing object, an aspect of the present embodiments as defined in claim 1 provides a front structure of a saddle riding type vehicle, the front structure including: a pair of left and right front forks (10) that rotatably support a front wheel; a top bridge (11) that supports upper portions of the front forks (10); a handlebar (14) fixed to the top bridge (11) via a handlebar holder (50); a meter (30) supported by the top bridge (11); and a meter visor (18) that covers the meter (30) from a front. The top bridge (11) is rotatably coupled to a front portion of a vehicle body frame of the saddle riding type vehicle to thereby allow the front wheel to be turned. The front structure is characterized by the following. Specifically, the meter (30) is supported by a meter stay (40) that is supported on the top bridge (11). The meter stay (40) includes a proximal portion (41) that is fastened to a front surface of the top bridge (11), a first arm portion (42) that extends forwardly from the proximal portion (41), a visor support portion (43) disposed at a front of the first arm portion (42), a second arm portion (45) that extends from the first arm portion (42), and a meter support portion (46) disposed at an extension end of the second arm portion (45). The meter (30) is fastened to and supported by the meter support portion (46) and the meter visor (18) has a front end (22) supported by the visor support portion (43) and a rear portion fastened to and supported by the meter support portion (46).

According to an aspect of the present embodiments as defined in claim 2, in the front structure as defined in claim 1, the second arm portion (45) includes a pair of left and right arm portions. Each of the left and right arm portions has the meter support portion (46) at a distal end thereof. The meter (30) and the meter visor (18) are jointly fastened to each of the meter support portions (46).

According to an aspect of the present embodiments as defined in claim 3, in the front structure as defined in claim 1 or 2, the visor support portion (43) has a positioning portion (44) that is U-shaped to be open upwardly in a side view. The meter visor (18) has the front end (22) engaged in the positioning portion (44). The meter support portions (46), the meter (30), and the meter visor (18) are fastened in a vehicle longitudinal direction.

According to an aspect of the present embodiments as defined in claim 4, in the front structure as defined in claim 2 or 3, the meter (30) includes a heat sink (31) disposed on a front surface thereof. The heat sink (31) cools the meter (30). The meter visor (18) has an opening (20) formed therein between the left and right meter support portions (46). The opening (20) allows traveling air to flow onto the heat sink (31).

According to an aspect of the present embodiments as defined in claim 5, in the front structure as defined in any one of claims 1 to 4, the first arm portion (42) and the second arm portion (45) are each extended linearly. The first arm portion (42) and the second arm portion (45) form a V-shape in a side view.

According to an aspect of the present embodiments as defined in claim 6, in the front structure as defined in any one of claims 1 to 5, the front structure further includes: a headlight (15) disposed below the meter (30) and supported by the top bridge (11) via a headlight stay (17). The headlight stay (17) is formed integrally with the handlebar holder (50) and extends downwardly from the top bridge (11) to thereby have a lower portion supporting the headlight (15).

According to an aspect of the present embodiments as defined in claim 7, in the front structure as defined in claim 6, the top bridge (11), the headlight stay (17), and the handlebar holder (50) are integrally molded from a metal material through, for example, casting or forging.

According to the aspect of the present embodiments as defined in claim 1, the meter stay includes the proximal portion that is fastened to the front surface of the top bridge, the first arm portion that extends forwardly from the proximal portion, and the second arm portion that extends upwardly toward the rear from the first arm portion, and the meter and the meter visor are fixed to the meter stay. This arrangement reduces the number of stays for fixing the meter and the meter visor at the front of the vehicle, to thereby achieve reduction in weight.

The reduction in weight of the meter stay disposed on the top bridge that is steered with the front wheel, in particular, achieves maneuverability of the handlebar.

The simplified meter stay allows the front of the vehicle to be simplified.

According to the aspect of the present embodiments as defined in claim 2, the meter visor has the front end supported by the visor support portion and the rear portion supported by the left and right meter support portions. This arrangement allows the meter visor to be supported at three points. This enhances support of the meter visor.

The second arm portion includes the arm portions extended laterally. This arrangement creates a space formed anterior to the meter and posterior to the meter visor, while reducing weight of the meter stay. The space allows various wires and pipes to be disposed thereinside.

According to the aspect of the present embodiments as defined in claim 3, when the meter visor is mounted on the meter stay, the front end of the meter visor is engaged in the positioning portion in the visor support portion, so that the meter visor is temporarily fixed in the longitudinal direction. Under this temporarily fixed condition, the rear portion of the meter visor can be fastened in the longitudinal direction. As a result, favorable positioning accuracy in the longitudinal direction of the meter and the meter visor can be achieved, while favorable maintainability of the meter visor is ensured. Thus, interference between the meter and the meter visor can be prevented without allowing a large clearance therebetween. As a result, favorable accuracy can be achieved in the clearance in areas around the meter that are visible from an occupant, so that appearance can be improved.

According to the aspect of the present embodiments as defined in claim 4, the opening in the meter visor for allowing traveling air to be guided onto the heat sink of the meter is disposed so as not to overlap the left and right meter support portions. The opening in the meter visor is thus disposed to circumvent the left and right meter support portions and the left and right second arm portions. The arrangement allows the traveling air to be introduced without being blocked by the meter stay. Cooling efficiency of the meter can thereby be favorably achieved.

According to the aspect of the present embodiments as defined in claim 5, the first arm portion and the second arm portion are each extended linearly and the first arm portion and the second arm portion form a V-shape in the side view. This arrangement achieves further reduction in weight, while enhancing stiffness of the meter stay.

According to the aspect of the present embodiments as defined in claim 6, the headlight stay is formed integrally with the handlebar holder. This arrangement simplifies the headlight stay, thus further simplifying the front of the vehicle.

According to the aspect of the present embodiments as defined in claim 7, the top bridge, the headlight stay, and the handlebar holder are integrally molded. This engineering feature allows the degree of freedom in design to be enhanced.

DETAILED DESCRIPTION

A specific embodiment of the present application applied to a motorcycle will be described below with reference to the accompanying drawings. Throughout the descriptions given hereunder, expressions indicating directions including up and down (vertical), left and right (lateral), and front and rear (longitudinal), are relative to the vehicle.

Figure 1:
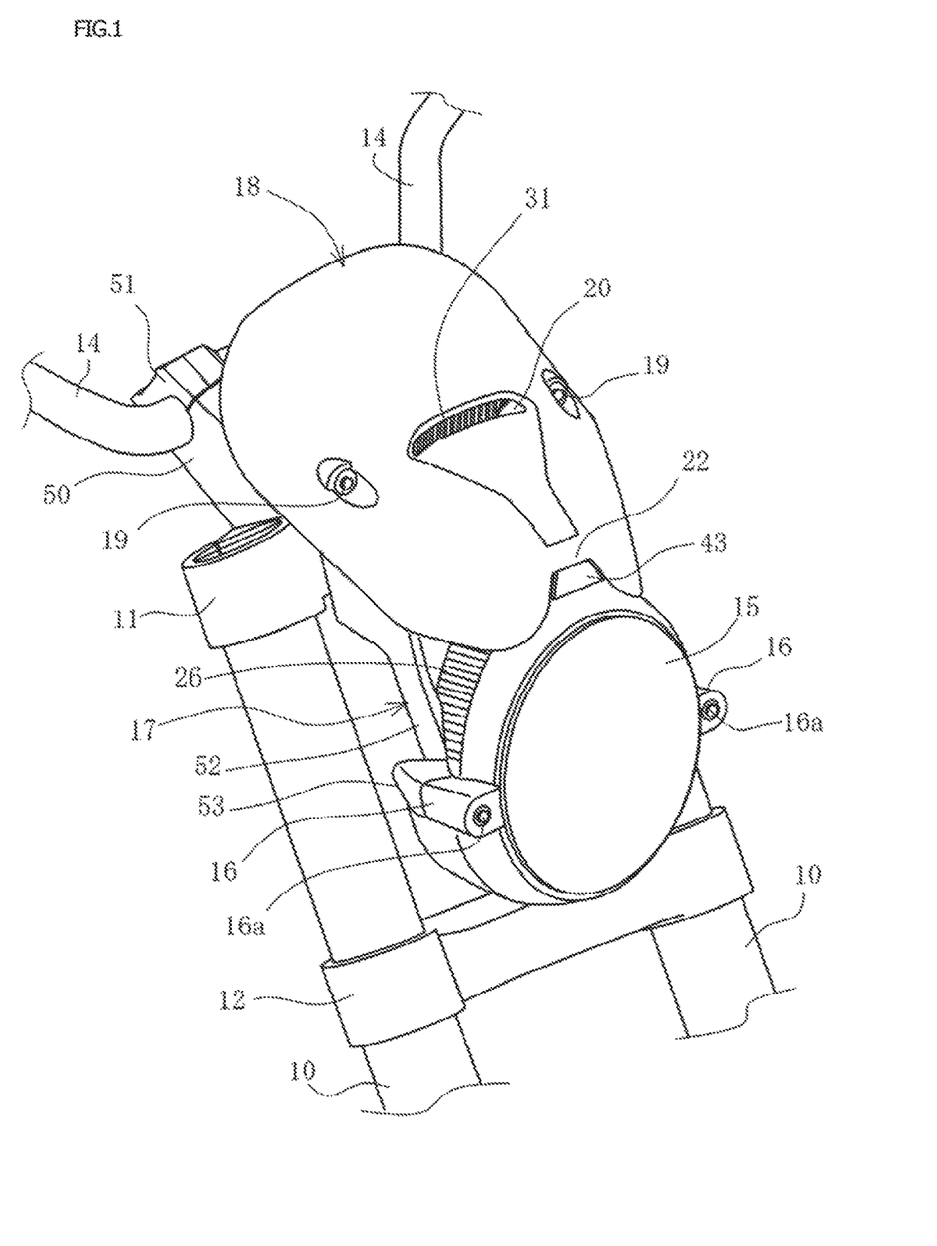
FIG. 1 is a perspective view of a front of a vehicle.
Figure 2:
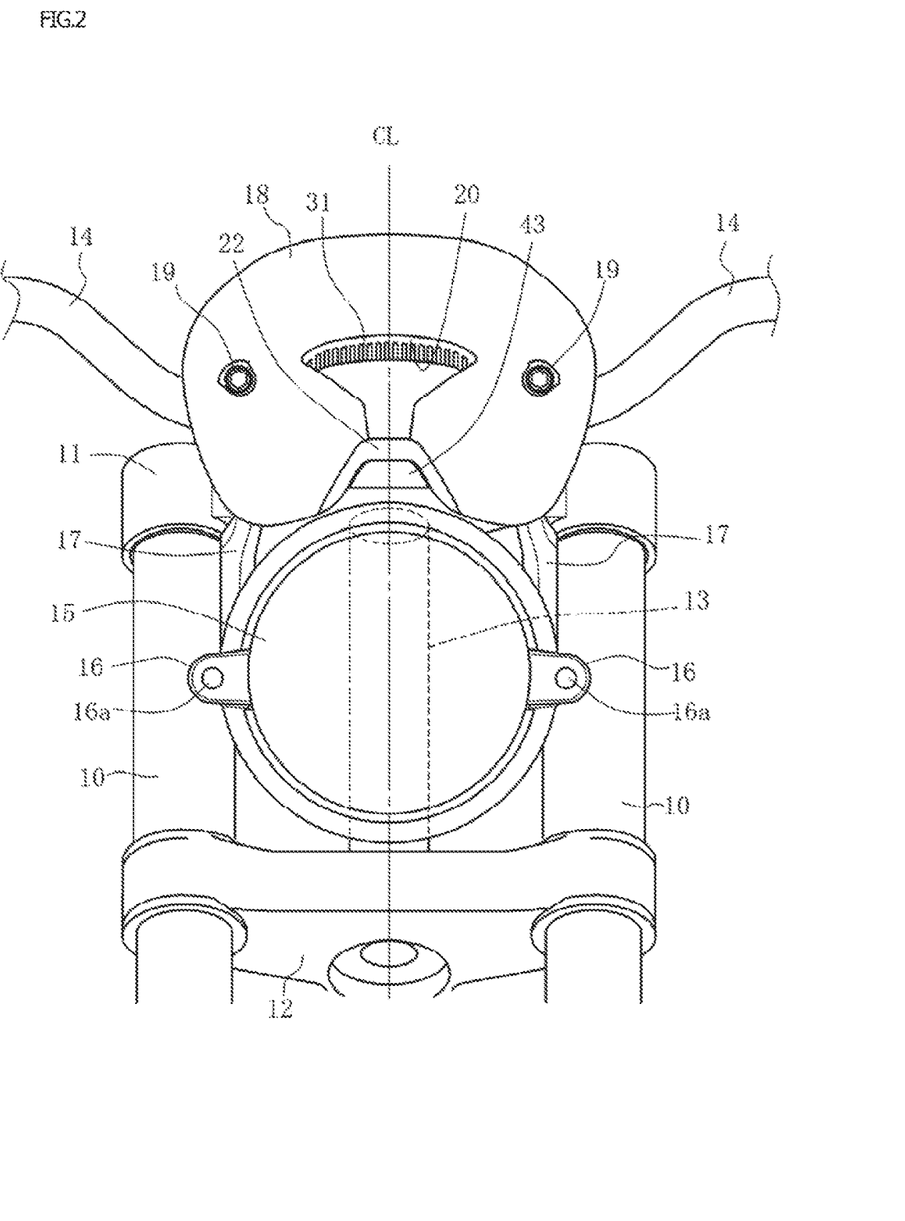
FIG. 2 is a front elevational view of the front of the vehicle.

Reference is made to FIGS. 1 and 2. A pair of left and right front forks 10 is rotatably supported on a head pipe 13 (FIG. 2) disposed at a front end of a vehicle body frame (not shown). The front forks 10 have upper ends supported by a top bridge 11 and lower portions supported by a bottom bridge 12.

A handlebar 14 is formed as a bar handle, and is fixed to an upper surface of the top bridge 11. Turning the handlebar 14 rotates the front forks 10, to thereby steer a front wheel (not shown) supported at lower ends of the front forks 10.

A large-sized headlight 15 that is circularly shaped in a front view is disposed in the middle between the top bridge 11 and the bottom bridge 12. The headlight 15 is supported in a headlight stay 17 with bolts 16a installed in bosses 16 disposed on both lateral sides of the headlight 15. It is noted that "a part in a front view" as used in the present application refers to the part mounted in the vehicle, viewed from the front of the vehicle in principle.

The headlight 15 includes an LED bulb as a light source. In the front view, the headlight 15 is disposed substantially in a space surrounded by the left and right front forks 10, the top bridge 11, and the bottom bridge 12 and only the bosses 16 slightly overlap the front forks 10.

The headlight stay 17 is formed of a metal and in left and right pairs. Each of the headlight stays 17 has an outer lateral side slightly overlapping an inside of a corresponding one of the front forks 10 and disposed inside an outline of the headlight 15. Each of the headlight stays 17 has a lower end connected to a corresponding one of bosses 16 and hidden behind the headlight 15 so as not to be exposed to traveling air from the front.

A meter visor 18 is disposed above the headlight 15. The meter visor 18 is supported by a meter stay 40 (FIG. 3) to be described later to thereby cover the front of a meter.

The meter visor 18 is formed of a resin or other appropriate material. The meter visor 18 has a curved surface that is curved obliquely downwardly toward the front to thereby allow the traveling air from the front to flow obliquely upwardly toward the rear. The meter visor 18 is fixed to the meter stay 40 with bolts 19 at left and right sides.

The meter visor 18 has an air guide port 20 formed at a center thereof. The air guide port 20 is open toward the front to thereby guide the traveling air from the front to the meter (to be described later) inside the meter visor 18. The air guide port 20 is disposed on a vehicle body center CL between left and right meter support portions 46 (to be described later) disposed posterior to the left and right bolts 19.

Figure 3:
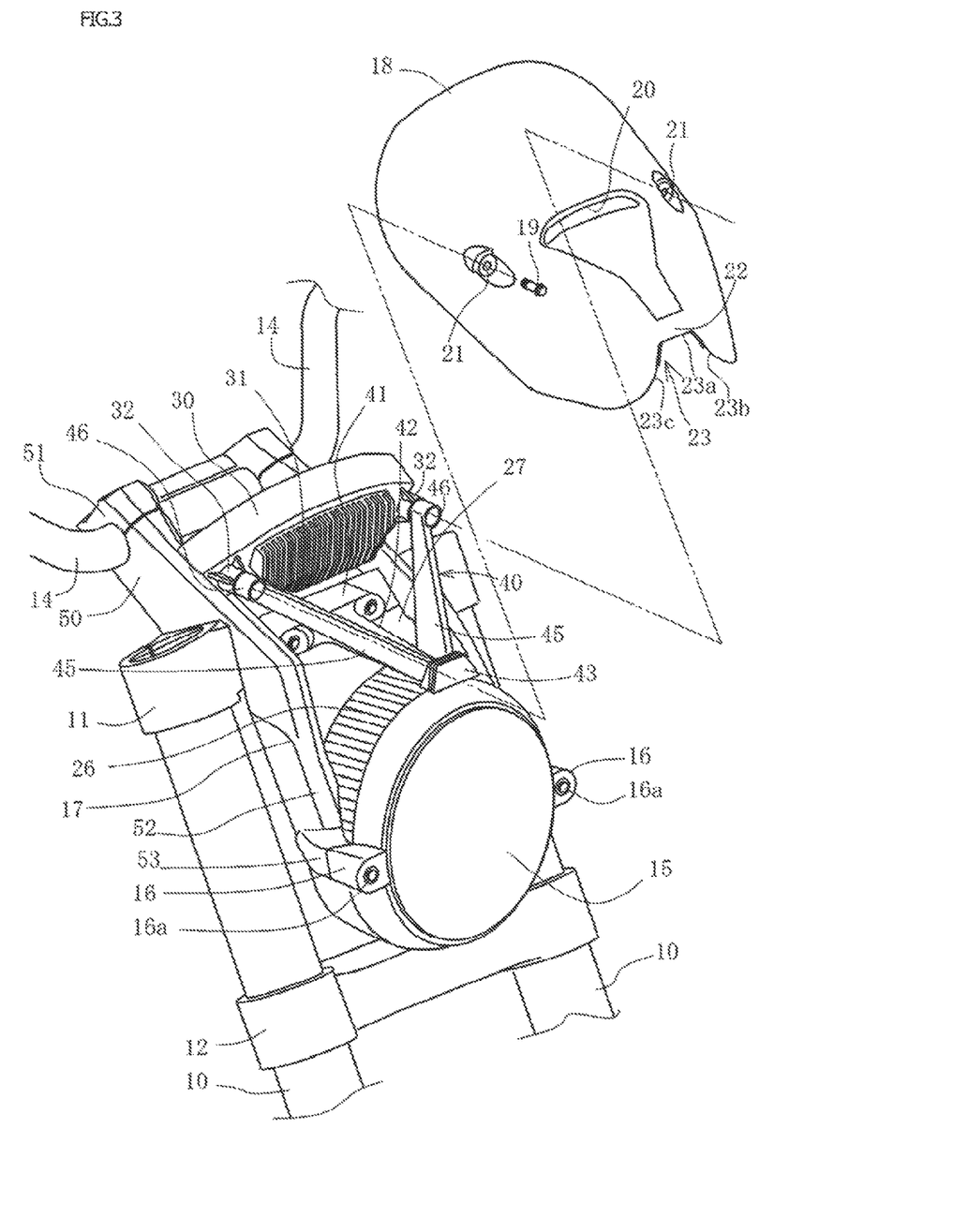
FIG. 3 is a perspective view of the front of the vehicle shown in FIG. 1 from which a meter visor is removed.
Figure 4:
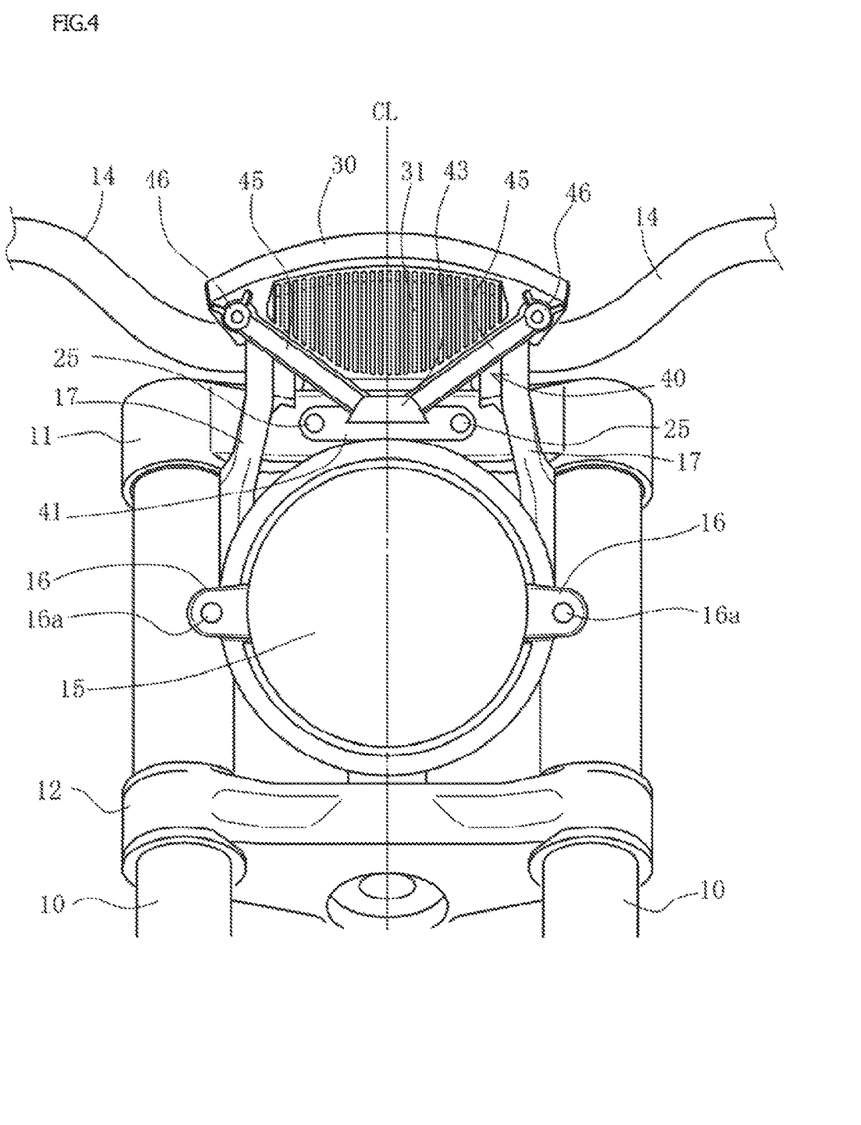
FIG. 4 is a front elevational view of the front of the vehicle shown in FIG. 2 from which the meter visor is removed.

As shown in FIGS. 3 and 4, removing the meter visor 18 reveals a meter 30, and the meter stay 40 that supports the meter 30.

The meter 30 is a well-known device that displays various types of information including a vehicle speed. The meter 30 is, for example, a speedometer. The meter 30 is disposed in a rearwardly inclined position such that a display face thereof faces an occupant posterior to the handlebar 14. The meter 30 has a bottom surface facing forwardly. A heat sink 31 is disposed on the bottom surface of the meter 30.

The heat sink 31 includes a plurality of heat radiating fins for cooling the meter 30. With the meter visor 18 mounted in the vehicle, the heat sink 31 is visible through the air guide port 20 in the front view (see FIG. 2).

Meter-side bosses 32 are integrally formed on both lateral sides of the bottom surface of the meter 30.

The meter stay 40 is formed of a rigid material such as a metal through casting, forging, or other appropriate method. The meter stay 40 includes a proximal portion 41, a first arm portion 42, a visor support portion 43, a pair of left and right second arm portions 45, and the pair of left and right meter support portions 46. Specifically, the proximal portion 41 is mounted on a front surface of the top bridge 11. The first arm portion 42 extends forwardly from the proximal portion 41. The visor support portion 43 is disposed at a front end of the first arm portion 42. The second arm portions 45 extend obliquely upwardly toward the rear from the visor support portion 43. The meter support portions 46 are disposed at rear ends of the second arm portions 45.

In the front view, the second arm portions 45 extend upwardly and expansively to substantially form a V-shape and extend obliquely upwardly toward the rear.

The meter support portions 46 having cylindrical shapes are disposed at distal ends of the second arm portions 45. The meter support portions 46 are aligned with the meter-side bosses 32 and visor-side bosses 21 of the meter visor 18 are aligned with the meter support portions 46. The meter visor 18 and the meter 30 are then jointly fastened to the meter support portions 46 using the bolts 19 inserted from the front.

The foregoing step results in the meter visor 18 and the meter 30 being jointly fastened to, and supported on, the meter stay 40 above the headlight 15.

The bolts 19 are tightened from the front to the rear along axes of the cylindrical meter support portions 46. The axes of the meter support portions 46 are, as a result, aligned with fastening axes, so that the meter visor 18 and the meter 30 are fastened to each other in the longitudinal direction with respect to the meter support portions 46.

The meter visor 18 has a flat front end 22 that faces to the front. The front end 22 has a cutout having substantially a U-shape turned upside down. The substantially U-shaped cutout is substantially identical to a shape of the visor support portion 43 in the front view and has edges that serve as an engagement portion 23. The engagement portion 23 substantially has a U-shape turned upside down in the front view, including an upper edge 23a and left and right side edges 23b and 23c. The engagement portion 23 fits into a positioning groove 44 to be described later in the visor support portion 43.

Figure 5:
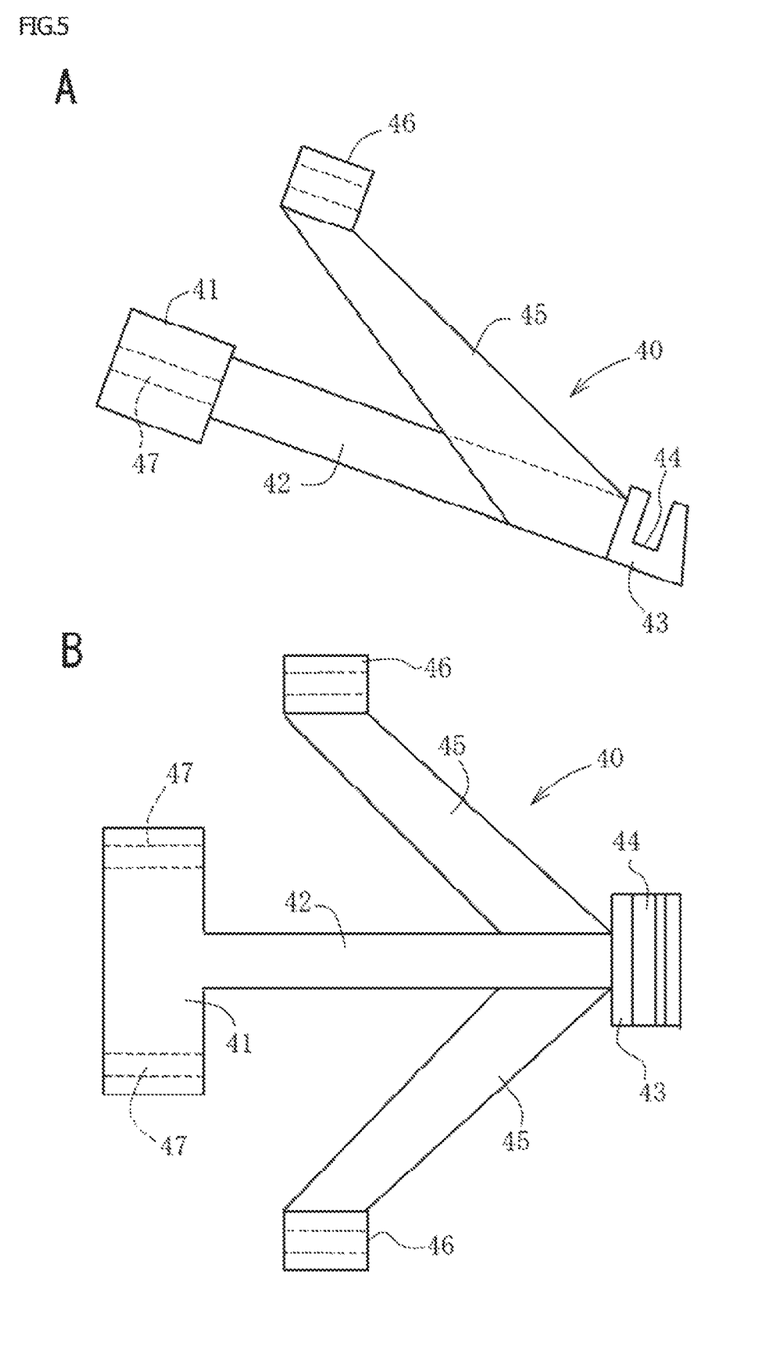
FIG. 5 shows a side elevational view and a plan view depicting a meter stay.

FIG. 5 shows a side elevational view and a plan view depicting the meter stay 40 in A and B, respectively. As shown in FIG. 5, the visor support portion 43 has the positioning groove 44 (that corresponds to the positioning portion in the present application) that is substantially U-shaped to be open upwardly in a side view. The engagement portion 23 cut out at the distal end of the meter visor 18 placed over the meter stay 40 is fitted into the positioning groove 44. This step causes the meter visor 18 to be positioned correctly with respect to the headlight stays 17, so that the visor-side bosses 21 are aligned with the meter support portions 46.

The visor support portion 43 is formed integrally with a fore-end of each of the first arm portion 42 and the two second arm portions 45. The first arm portion 42 and the pair of left and right second arm portions 45 each extend linearly. The second arm portions 45, because of their two arms extending obliquely upwardly, forms a V-shape in the front view.

The visor support portion 43 extends in the vehicle width direction over a width that is substantially equal to a width in the vehicle width direction of the meter visor 18 at the front end 22 to thereby be formed widely. The positioning groove 44 is formed to extend a full wall width of the visor support portion 43 in the lateral direction. The fitting of the engagement portion 23 into the positioning groove 44 results in, of the engagement portion 23 substantially having the U-shape turned upside down in the front view, the upper edge 23a abutting on a bottom of the positioning groove 44 and the left and right side edges 23b and 23c crossing outwardly to be into abutment with respective ends of the bottom of the positioning groove 44. This fitting causes the meter visor 18 to be correctly positioned with respect to the meter stay 40 both in the longitudinal direction and in the lateral direction.

Figure 6:
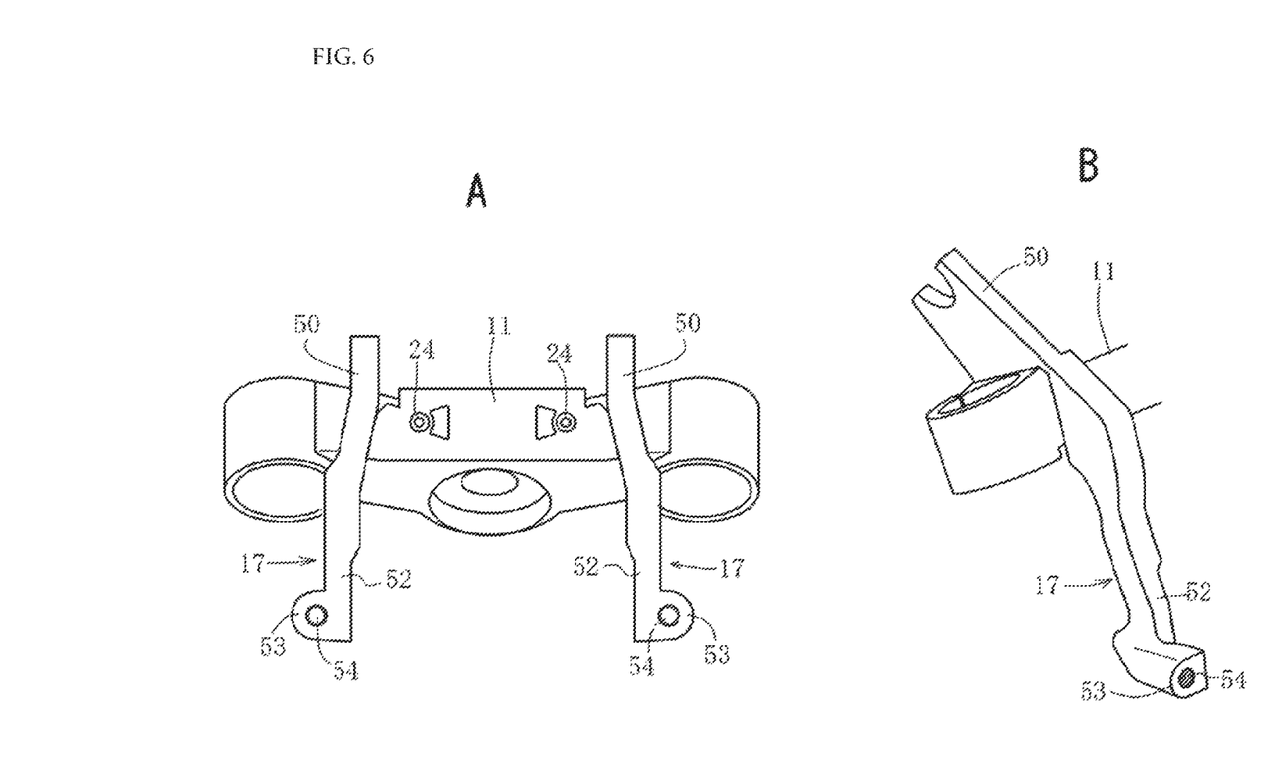
FIG. 6 shows a front perspective view and a perspective view depicting a headlight stay.

The first arm portion 42 connects the proximal portion 41 linearly to the visor support portion 43. The proximal portion 41 has mounting holes 47 in both lateral ends thereof. The mounting holes 47 are aligned with bosses 24 (FIG. 6A) disposed on the front surface of the top bridge 11. Bolts 25 are then installed from the front and tightened to fix the proximal portion 41 to the front surface of the top bridge 11 (see FIG. 4).

Under the foregoing condition, the meter stay 40 protrudes to the front obliquely downwardly from the front surface of the top bridge 11 and the visor support portion 43 is disposed above the headlight 15.

FIG. 6 shows a front perspective view and a perspective view depicting the top bridge 11 including the headlight stays 17 in A and B, respectively. As shown in FIGS. 3 and 6, the headlight stays 17 are integrated with the top bridge 11 and have upper portions extending upwardly from the top bridge 11 to thereby form handlebar holders 50. The handlebar 14 is placed on upper ends of the handlebar holders 50, a set plate 51 (FIGS. 1 and 3) is placed over the handlebar 14 from above, and the set plate 51 is fastened to the handlebar holders 50 with bolts (not shown). The handlebar 14 is thereby attached to the top bridge 11.

The headlight stays 17 are continuous from the handlebar holders 50 to extend downwardly from the top bridge 11. The headlight stays 17 extend obliquely downwardly and forwardly from the top bridge 11. Further, the headlight stays 17 are bent at positions below the top bridge 11 and extend downwardly substantially in parallel with the front forks 10 to thus form stay main portions 52. In the present embodiment, the top bridge 11, the headlight stays 17, and the handlebar holders 50 are integrally molded from a metal material through, for example, casting or forging. This engineering feature allows the degree of freedom in design to be enhanced.

Bosses 53 are formed at lower ends of the stay main portions 52. The bosses 53 have nuts 54 and are to be aligned with the bosses 16 of the headlight 15. The bosses 53 are disposed substantially at an intermediate position between the top bridge 11 and the bottom bridge 12.

The stay main portions 52 are disposed inside the outline of the headlight 15 in a front view with only the bosses 53 protruding outwardly. The bosses 53 are to be aligned with the bosses 16 of the headlight 15.

The headlight 15 is inserted into a space between the left and right stay main portions 52 from the front. The bosses 16 that protrude outwardly from both lateral sides of an outer periphery of the headlight 15 are aligned the bosses 53 of the headlight stays 17. The bolts 16a are then inserted from the front to be tightened to the nuts 54. The headlight 15 is thereby fixed onto the stay main portions 52.

The headlight 15 has a back side that is formed to be narrow so as to be inserted between the left and right stay main portions 52. A heat sink 26 (FIG. 3) is disposed on an outer periphery of the back side of the headlight 15.

The headlight 15 includes an LED bulb as the light source. Heat generated by the LED bulb is quickly dissipated through cooling of the heat sink 26 by traveling air. Durability of the LED bulb is thereby improved.

In addition, the headlight 15 is disposed in a space surrounded by a frame shape formed by the left and right front forks 10, the stay main portions 52, the top bridge 11, and the bottom bridge 12. This structure achieves smooth flowing of traveling air through the space, thus promoting cooling by the heat sink 26.

Effects of the embodiment of the present application will be described below. To mount the meter stay 40 on the top bridge 11, as shown in FIGS. 3 and 4, the proximal portion 41 is placed over the front surface of the top bridge 11, the mounting holes 47 are aligned with the bosses 24 on the front surface of the top bridge 11 (FIG. 6A), and then the bolts 25 are tightened from the front. These steps result in the proximal portion 41 being fixed onto the front surface of the top bridge 11, causing the meter stay 40 to protrude to the front.

The meter 30 and the meter visor 18 are then mounted on the meter stay 40. First, as shown in FIG. 3, the meter visor 18 is placed over the meter stay 40 and the front end 22 is fitted into the positioning groove 44 in the visor support portion 43. The foregoing step results in the engagement portion 23 engaging the positioning groove 44, so that the meter visor 18 is correctly positioned in the longitudinal direction and the lateral direction and the visor-side bosses 21 are aligned with the meter support portions 46 from the front, and to be in temporarily fixed condition.

The meter-side bosses 32 of the meter 30 are then aligned from behind with the meter support portion 46. Tightening the bolts 19 from the front jointly fastens and supports the meter 30 and the meter visor 18 with respect to the meter stay 40.

At this time, the meter visor 18 that is only temporarily secured is positioned correctly in the longitudinal direction and the lateral direction. The meter visor 18 is also supported without being fallen from the meter stay 40 even when the meter visor 18 is released from hands. The temporary support of the meter visor 18 allows the bolts 19 to be tightened easily from the front with the meter-side bosses 32 of the meter 30 held in alignment with the meter support portion 46 without the need to hold the meter visor 18 by hands. Additionally, the meter visor 18 is fixed with the fastening members (bolts 19) to the meter support portion 46 in a condition of being defined in a longitudinal position.

The temporary fixing of the meter visor 18 to the meter stay 40 achieves maintainability in removal and reinstallation of the meter visor 18. The temporary fixing of the meter visor 18 to the meter stay 40 further ensures favorable positioning accuracy in the longitudinal direction of the meter 30 and the meter visor 18 and prevents interference between the meter 30 and the meter visor 18 without allowing a large clearance therebetween.

As a result, favorable accuracy can be achieved in the clearance in areas around the meter 30 that are visible from an occupant, so that appearance can be improved. Moreover, the joint fastening of the meter 30 and the meter visor 18 to the meter stay 40 reduces the number of fastening steps to be performed and enables common use of the support stay.

As shown in FIGS. 3 and 5, the meter stay 40 includes the proximal portion 41 that is fixed to the front surface of the top bridge 11, the first arm portion 42 that extends forwardly from the proximal portion 41, the second arm portions 45 that extend obliquely upwardly toward the rear from the first arm portion 42, and the meter support portions 46 disposed at extension ends (the rear ends) of the second arm portions 45. The meter 30 and the meter visor 18 are fixed to this meter stay 40.

Thus, the meter stay 40 serves not only as a support member for the meter 30, but also as a visor stay that supports the meter visor 18. This arrangement reduces the number of stays for fixing the meter 30 and the meter visor 18 at the front of the vehicle and thus achieves reduction in weight. The arrangement further simplifies the structure of the meter stay 40, thereby simplifying the front of the vehicle.

Additionally, the first arm portion 42 and the second arm portions 45 are each extended linearly and the first arm portion 42 and the second arm portions 45 form a V-shape in a side view. This arrangement achieves further reduction in weight, while enhancing stiffness of the meter stay 40.

The reduced weight of the meter stay 40 at the front of the vehicle reduces the weight of the meter stay 40 mounted on the top bridge 11 that is steered with the front wheel. This achieves maneuverability of the handlebar.

Additionally, as shown in FIG. 2, the meter visor 18 has the front end 22 supported by the visor support portion 43 and the rear portion supported by the left and right meter support portions 46 (FIG. 4) using the left and right bolts 19, to thereby be supported at three points. This enhances support of the meter visor 18.

As shown in FIGS. 3 and 4, the second arm portions 45 are extended laterally as arm-shaped members to form a V-shape in the front view. This arrangement creates a space 27 (FIG. 3) formed anterior to the meter 30 and posterior to the meter visor 18, while reducing weight of the meter stay 40. The space 27 allows various wires and pipes to be disposed thereinside.

Examples of such wires and pipes include a meter harness, a handlebar switch harness, a grip heater harness, a brake hose, and a clutch cable (none of these elements are shown).

As shown in FIGS. 1 and 2, the meter visor 18 has the forwardly opening air guide port 20 (that corresponds to the opening in the present application) formed at a center thereof. Thus, traveling air is guided through the air guide port 20 to be blown against the heat sink 31 provided on the meter 30 disposed posterior to the air guide port 20. The traveling air can thereby quickly dissipate heat from the heat sink 31, achieving favorable cooling efficiency of the meter 30.

Moreover, the air guide port 20 is disposed so as to circumvent the left and right meter support portions 46 and the left and right second arm portions 45. The arrangement allows the traveling air to be introduced without being blocked by the meter stay 40.

As shown in FIGS. 3 and 6, the headlight stays 17 that support the headlight 15 are formed integrally with the handlebar holders 50. This arrangement simplifies the headlight stays 17, thus further simplifying the front of the vehicle.

It should be noted that the present application is not limited to the above-described embodiment and may include various modifications within the scope of the spirit of the present application. For example, the saddle riding type vehicle is not limited to the motorcycle, but may include various types of vehicles including a three-wheeled vehicle.

The meter 30 is not limited to the speedometer, but may include a various types of, or a plurality of, devices configured into a single unit.

The second arm portions 45, which are extended rearwardly from the front end of the first arm portion 42, may be extended from an intermediate portion of the first arm portion 42. Alternatively, the second arm portions 45 may be extended from any point in the first arm portion 42 and in any direction, whether in the longitudinal or the vertical direction. Thus, the degree of freedom in the layout of the meter can be enhanced.

The first arm portion 42, which is a single member, may even be formed of a lighter member that may be plate-shaped members extending in parallel with each other or pipe-shaped members.

Additionally, instead of the positioning groove 44 formed inside the full wall width of the visor support portion 43, the visor support portion 43 may be formed into a member having a substantially U-shaped section, such as a channel member.

DESCRIPTION OF REFERENCE NUMERALS

10: Front fork, 11: Top bridge, 12: Bottom bridge, 14: Handlebar, 15: Headlight, 17: Headlight stay, 18: Meter visor, 20: Air guide port, 30: Meter, 50: Handlebar holder

What is claimed is:

1. A front structure of a saddle riding type vehicle, comprising:
    a pair of left and right front forks that rotatably supports a front wheel;
    a top bridge that supports upper portions of the front forks;
    a handlebar fixed to the top bridge via a handlebar holder;
    a meter supported by the top bridge; and
    a meter visor that covers the meter from a front,
    wherein the top bridge is rotatably coupled to a front portion of a vehicle body frame of the saddle riding type vehicle and configured for turning the front wheel,
    wherein the meter is supported by a meter stay that is supported on the top bridge,
    wherein the meter stay includes a proximal portion that is fastened to a front surface of the top bridge, a first arm portion that extends forwardly from the proximal portion, a visor support portion disposed at a front of the first arm portion, a second arm portion that extends from the first arm portion, and a meter support portion disposed at an extension end of the second arm portion, and
    wherein the meter is fastened to and supported by the meter support portion and the meter visor has a front end supported by the visor support portion and a rear portion fastened to and supported by the meter support portion.

2. The front structure of a saddle riding type vehicle according to claim 1, wherein the second arm portion includes a pair of left and right arm portions, each of the left and right arm portions having the meter support portion at a distal end thereof, the meter and the meter visor being jointly fastened to each of the meter support portions.

3. The front structure of a saddle riding type vehicle according to claim 2,
    wherein the visor support portion has a positioning portion that is U-shaped to be open upwardly in a side view, the meter visor having the front end engaged in the positioning portion, and
    wherein the meter support portions, the meter, and the meter visor are fastened in a longitudinal direction of the vehicle.

4. The front structure of a saddle riding type vehicle according to claim 2,
    wherein the meter includes a heat sink disposed on a front surface thereof, the heat sink cooling the meter, and
    wherein the meter visor has an opening formed therein between the left and right meter support portions, the opening configured to force traveling air to flow onto the heat sink.

5. The front structure of a saddle riding type vehicle according to claim 2, wherein the first arm portion and the second arm portion are each extended linearly, and the first arm portion and the second arm portion form a V-shape in a side view.

6. The front structure of a saddle riding type vehicle according to claim 2 further comprising:
    a headlight disposed below the meter and supported by the top bridge via a headlight stay, wherein the headlight stay being formed integrally with the handlebar holder and extending downwardly from the top bridge to thereby have a lower portion supporting the headlight.

7. The front structure of a saddle riding type vehicle according to claim 6, wherein the top bridge, the headlight stay, and the handlebar holder are integrally molded from a metal material.

8. The front structure of a saddle riding type vehicle according to claim 7, wherein the top bridge, the headlight stay, and the handlebar holder are integrally molded by casting or forging.

9. The front structure of a saddle riding type vehicle according to claim 1,
    wherein the visor support portion has a positioning portion that is U-shaped to be open upwardly in a side view, the meter visor having the front end engaged in the positioning portion, and
    wherein the meter support portions, the meter, and the meter visor are fastened in a longitudinal direction of the vehicle.

10. The front structure of a saddle riding type vehicle according to claim 9,
    wherein the meter includes a heat sink disposed on a front surface thereof, the heat sink cooling the meter, and
    wherein the meter visor has an opening formed therein between the left and right meter support portions, the opening configured to force traveling air to flow onto the heat sink.

11. The front structure of a saddle riding type vehicle according to claim 9, wherein the first arm portion and the second arm portion are each extended linearly, and the first arm portion and the second arm portion form a V-shape in a side view.

12. The front structure of a saddle riding type vehicle according to claim 9, further comprising:
    a headlight disposed below the meter and supported by the top bridge via a headlight stay, wherein the headlight stay being formed integrally with the handlebar holder and extending downwardly from the top bridge to thereby have a lower portion supporting the headlight.

13. The front structure of a saddle riding type vehicle according to claim 12, wherein the top bridge, the headlight stay, and the handlebar holder are integrally molded from a metal material.

14. The front structure of a saddle riding type vehicle according to claim 1, wherein the first arm portion and the second arm portion are each extended linearly, and the first arm portion and the second arm portion form a V-shape in a side view.

15. The front structure of a saddle riding type vehicle according to claim 14, further comprising:
a headlight disposed below the meter and supported by the top bridge via a headlight stay, wherein the headlight stay being formed integrally with the handlebar holder and extending downwardly from the top bridge to thereby have a lower portion supporting the headlight.

16. The front structure of a saddle riding type vehicle according to claim 15, wherein the top bridge, the headlight stay, and the handlebar holder are integrally molded from a metal material.

17. The front structure of a saddle riding type vehicle according to claim 16, wherein the top bridge, the headlight stay, and the handlebar holder are integrally molded by casting or forging.

18. The front structure of a saddle riding type vehicle according to claim 1, further comprising:
a headlight disposed below the meter and supported by the top bridge via a headlight stay, wherein the headlight stay being formed integrally with the handlebar holder and extending downwardly from the top bridge to thereby have a lower portion supporting the headlight.

19. The front structure of a saddle riding type vehicle according to claim 18, wherein the top bridge, the headlight stay, and the handlebar holder are integrally molded from a metal material.

20. The front structure of a saddle riding type vehicle according to claim 19, wherein the top bridge, the headlight stay, and the handlebar holder are integrally molded by casting or forging.

* * * * *